Sept. 18, 1951 R. G. R. TOUVAY 2,568,040
MACHINE FOR FORMING CONOIDAL SURFACES
Filed Dec. 10, 1946 3 Sheets-Sheet 1

INVENTOR
ROBERT G. R. TOUVAY

ATTORNEYS

Sept. 18, 1951     R. G. R. TOUVAY     2,568,040
MACHINE FOR FORMING CONOIDAL SURFACES
Filed Dec. 10, 1946     3 Sheets-Sheet 2

INVENTOR
ROBERT G.R. TOUVAY

ATTORNEYS

Sept. 18, 1951  R. G. R. TOUVAY  2,568,040
MACHINE FOR FORMING CONOIDAL SURFACES
Filed Dec. 10, 1946  3 Sheets-Sheet 3
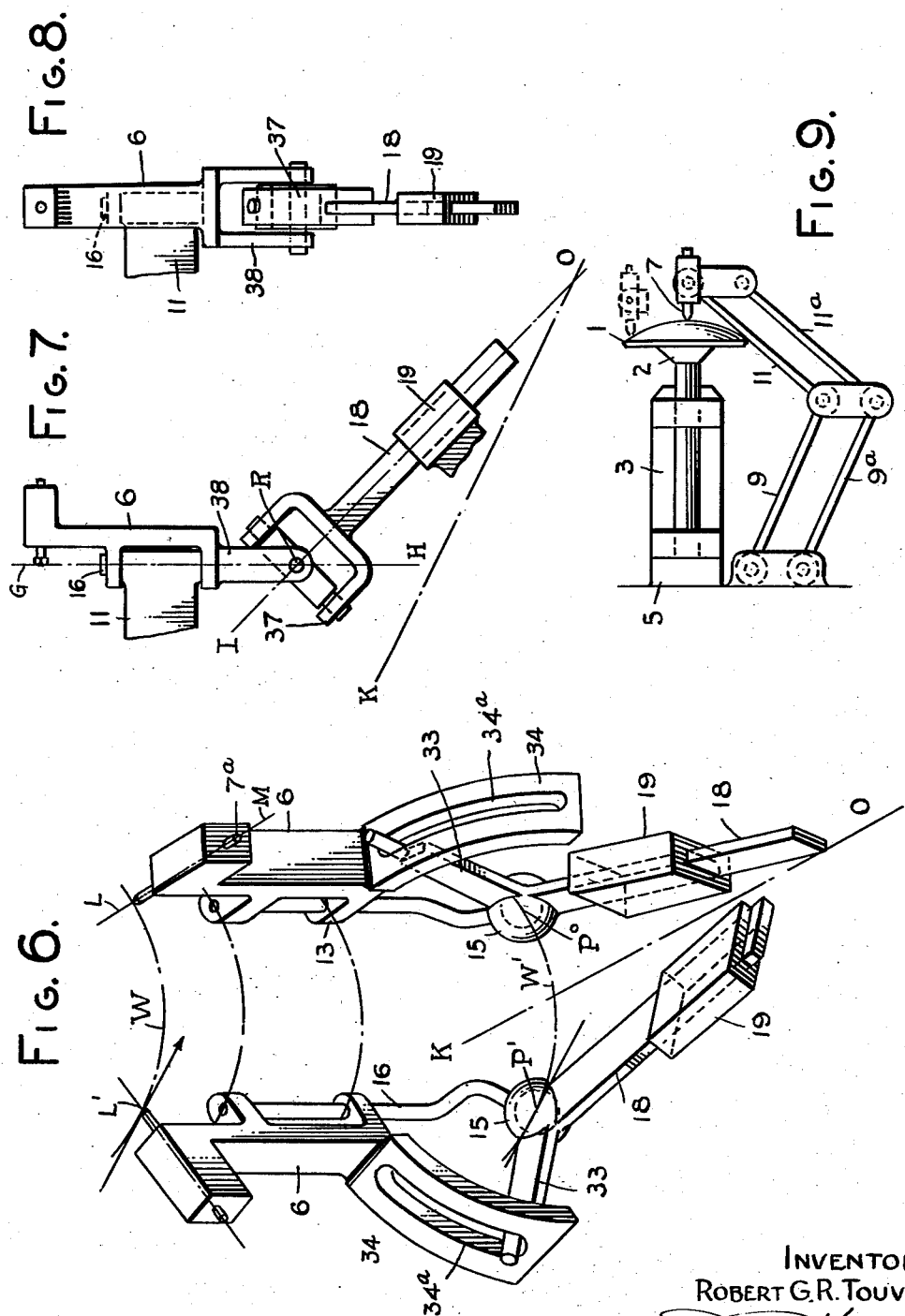
INVENTOR
ROBERT G. R. TOUVAY
ATTORNEYS Patented Sept. 18, 1951

2,568,040

UNITED STATES PATENT OFFICE 2,568,040

MACHINE FOR FORMING CONOIDAL SURFACES

Robert G. R. Touvay, Paris, France, assignor to Societe Anonyme des Manufactures des Glaces & Produits Chimiques de Saint-Gobain, Chauny & Cirey, Paris, France Application December 10, 1946, Serial No. 715,247
In France March 27, 1945

Section 1, Public Law 690, August 8, 1946
Patent expires March 27, 1965

10 Claims. (Cl. 51—58)

1

This invention is directed to providing means for guiding a forming tool in an elliptical, parabolic or hyperbolic path in a plane across the surface of a revolving body, to thereby produce a conoid, which may be a spheroid, paraboloid or a hyperboloid; and to this end guides the tool in a plane passing through the center of revolution of the body by causing it to follow a path determined by the cutting in a horizontal plane of a surface formed by the movement of a line around an axis inclined to the plane of transverse movement of the tool. In the following it will be presumed that the axis of rotation of the work is horizontal and inclinations of the various axes of movement will be described on this presumption but it will be obvious that the axis of rotation may have any orientation desired, in which case the orientations hereinafter described will change to preserve the relative orientations to be set forth.

The forming tool may be either a cutting tool or a grinding tool. In the latter case it will be found advisable to maintain its working face at a tangent to the surface operated on and my invention includes means for this purpose. This is especially desirable when the working surface of the tool is at right angles to the axis of rotation of the tool, as in the case with end grinding.

This invention will be found especially useful in shaping ceramic lenses and mirrors.

Referring to the drawings, in which corresponding parts are designated by corresponding marks of reference, Figures 1, 2 and 3 are respectively a side, an end, and a plan view of an apparatus embodying my invention, the meridian curve represented in Figure 3 being of greater radius than that shown in Figure 1 for the purposes of better illustration.

Figure 6 is a detail of a part of the mechanism shown in Figure 4.

Figures 7 and 8 are respectively side and plan detail views of a modified form of the controls shown in Figures 1, 2 and 3.

Figure 9 is a plan view of a modified form of the mounting for the tool which constrains it to move in a horizontal plane.

Figure 1:
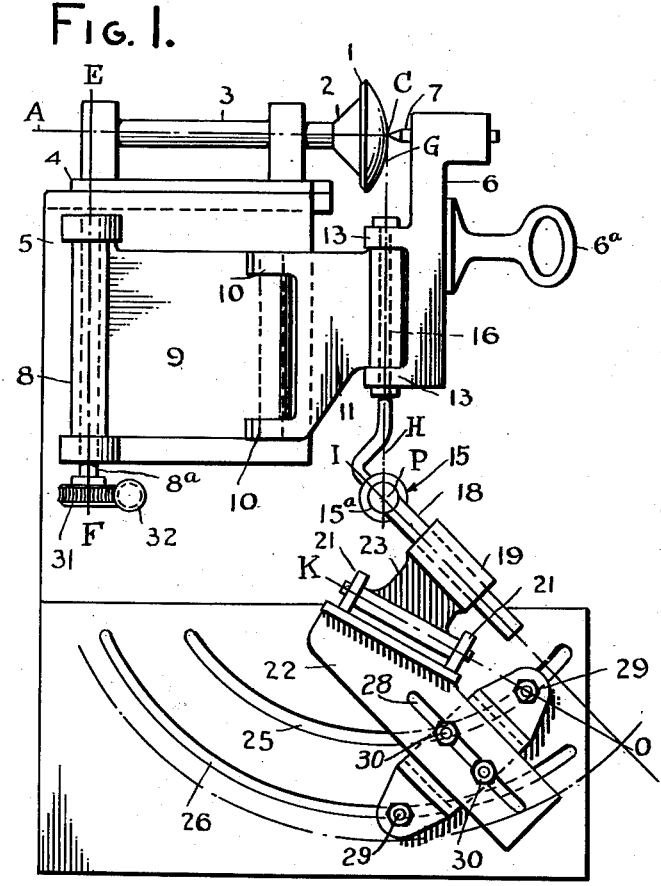
Figure 2:
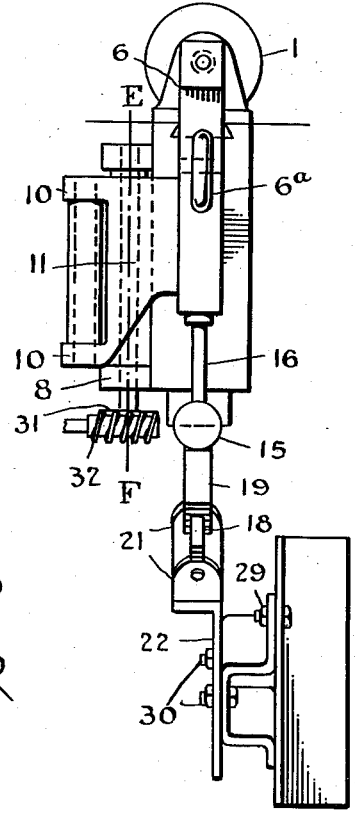
Figure 3:
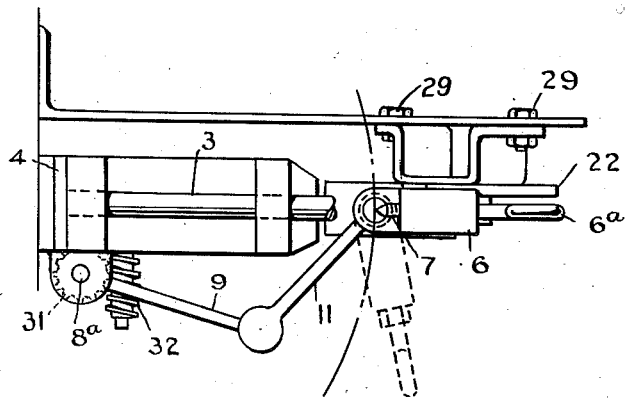

Referring to Figures 1, 2 and 3, 1 is the work

2 being operated on, mounted on a chuck 2 (as by cementing) on the forward end of the horizontal head stock 3 rotated in any suitable way and mounted in bearings in the carriage 4, which is slidingly mounted on the base 5 by which the work may be advanced towards the tool 7 carried in the horizontal plane of the axis of rotation of the head stock by the tool rest 6.

The tool rest is carried on the outer end of a link 11, the other end of which has ears 10 pivoted on the outer end of a link 9, the opposite end of which is carried by the shaft 8 mounted in the side of the base 5 to move around the vertical axis E—F. Thus the tool holder can be shifted across the axis of the work by the handle 6a and while constrained to move in a horizontal plane by the links 9 and 11, is free to occupy a wide range of positions in that plane. Instead of swinging the tool holder by hand an automatic transverse feed may be given to it by a worm wheel 31 on the shaft 8a and a properly driven worm 32.

If desired, instead of carrying the tool holder on the single links 9 and 11, as shown in Figure 3, one may use a parallel link construction, as shown in Figure 9, embodying links 9 and 9a and 11 and 11a in which case the tool will remain in fixed orientation to the axis of rotation as is shown by the dotted tool holder of the work during its transverse feed. Or, as an alternative, and in order to permit the tool to be presented to the surface of the work at any desired angle to the axis of rotation, the tool holder (see Figure 3) may be pivoted to the end of the link 11 so as to turn around a vertical axis G—H, the handle 6a being used to control such angle.

The path of motion of the tool in the horizontal plane is controlled by a driver 15 (see Figures 1, 2 and 3) moving in a horizontal plane in a curve formed by the intersection of such plane and the successive positions of a generatrix moving around an axis at an angle to said plane, the inclination of the axis determining which of the several conoids will be formed by the tool.

For this purpose the ears 13 of the tool holder are keyed to a vertical shaft 16 having its lower end connected by a universal joint with the driver, at a point P in the axis G—H passing through the work point. In Figures 1 and 2 this joint is formed by the ball 15a on a rod 18 slidingly mounted in the bearing 19 on the frame 23 and embraced within a socket on the lower end of the shaft 16. The axis O—I of the bearing 19 is at an angle to the axis O—K of the frame 23 around which the bearing 19 may oscillate and the position of the point P is at all times at the intersection of the axis G—H and the axis O—I, the meridian curve represented in Figure 5 being of greater radius than that shown in Figure 4 for the purposes of better illustration.

As the vertical distance between the tool and the driver is fixed and as the tool is constrained to move in a horizontal plane, it follows that the driver can only move in a horizontal plane. The position of the driver in this plane will, however, be determined by the angular relation of such plane to the axis O—K. Thus if O—K is vertical the driver will describe a circle in a horizontal plane while if inclined its path will be elliptical, parabolic, or hyperbolic in accordance with the angle existing between such angle and the horizontal. If the tool is constrained to follow the motion of the driver in its horizontal plane, the tool will traverse the work with a similar curve.

It will be noted that the axis O—I of the bearing 19 in moving around the axis O—K generates a coned surface and that the point P is always on that surface and also always in one horizontal plane.

In order to permit the inclination of the axis O—K to be varied in accordance with the shape which it is desired to be given to the work, the axis O—K is central of the bearing 19 between ears 21 of a carrier 22 mounted to move in a circular path on the slides 25 and 26 around the point P and to be locked thereon by means of the bolts 29.

In order to control the size of the coned path described by the point P, the carrier 22 is provided with a slot 28 which is parallel to the axis O—I of Figure 1, and finally locked in the convenient position by means of the bolts 30.

Figure 4:
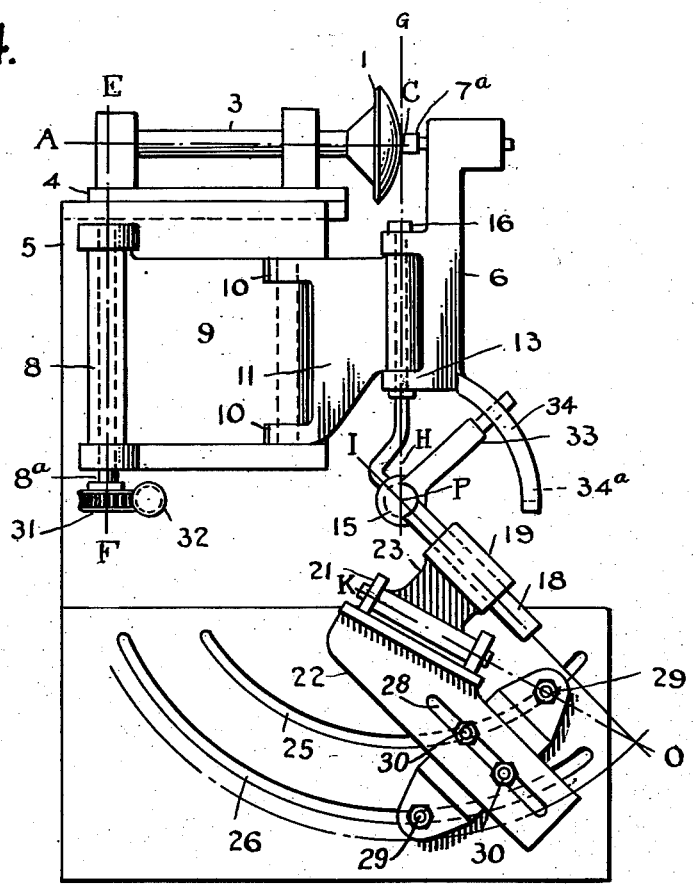
Figures 4 and 5 are respectively a side and a plan view of a form thereof in which means are provided for maintaining the working face of the tool at a fixed orientation in respect to the surface it is working on at any time, the meridian curve represented in Figure 5 being of greater radius than that shown in Figure 4 for the purposes of better illustration.
Figure 5:
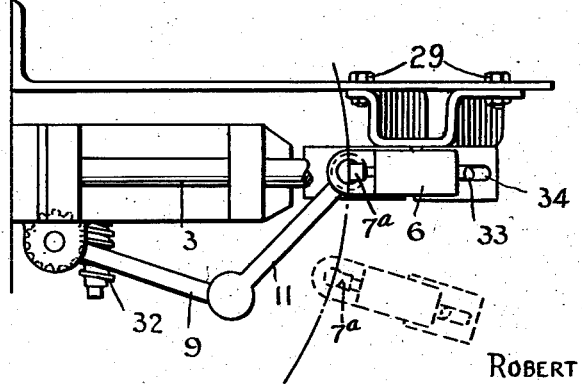

In the constructions just discussed the tool may be manually shifted angularly in a horizontal plane in respect to the axis of rotation of the work, but when the tool is an end grinding one, as shown at 7a of Figures 4 and 5, it is desirable that it be maintained during its transverse movement with its working face tangent to the point of the surface operated on. A means of accomplishing this is shown in Figures 4 and 5 involving locking the bar 18 against rotation in the bearing 19 (as by squaring the bar) and a finger 33 projecting laterally from the bar 18 in the same plane as are the axes O—I and O—K and taken into a slot 34a in a curved ear projecting downwardly and rearwardly from the bottom of the tool holder in the vertical plane of axis L—M of the tool 7a, see Fig. 6. This is further illustrated in Figure 6 which represents two positions assumed by a tool holder. In the position on the right the tool is axial of the head stock; while that to the left is off center. In moving from the first position to the second the driver 18 and its center P has moved from the position Po to P' through a path W' which lies on the surface of the cone described by the axis O—I in its oscillation around the axis O—K and which path lies in a horizontal plane, this being permitted by the endwise motion of the bar. The tool 7a likewise has moved from L to L' along a path W parallel with the path W'.

In Figures 7 and 8 a form of my invention is disclosed embodying a gimbal joint in lieu of the ball and socket joint previously discussed. The members of this joint are of the usual construction consisting of two yokes 37 and 38 the former connected to the bar 18 and the latter with the tool holder 6 or pivot pin 16. In any event the effective center R of the gimbal joint should be at the intersection of the axes G—H and O—I.

Having thus described my invention what I claim as new and useful and desire to secure by United States Letters Patent is:

1. In a device of the class described, the combination with a horizontal head stock and chuck mounted thereon, of a tool holder provided with means for moving it transversely of the head stock in a horizontal plane, means for giving the tool holder any desired angular relation to the axis of the head stock about the vertical axis passing by the working point of the tool and the axis of the head stock, a frame driven about an axis contained in the vertical plane of the axis of the head stock, a driver mounted on the same frame and capable of movement lengthwise of a straight guide secured to the frame and inclined to the axis of the frame, a universal joint connecting the driver and tool holder whereby the tool is constrained to follow the path of movement of the driver and whereby the driver is constrained to move in a plane parallel with that in which the tool holder is movable, means for tilting the frame about the center of the driver when that center is in the vertical plane of the head stock and means for sliding the frame in said plane along a line parallel to the straight guide when it is in said vertical plane.

2. In a device for forming articles with a conoidal surface, the combination with a horizontal headstock and a chuck mounted thereon, of a forming tool and its holder, a pair of links pivoted to each other, one of such links being pivoted to the tool holder, and the other to the stationary frame, all of said pivots being vertical and the pivot between the first link and holder being in the vertical line of the working end of the forming tool, a movable driver, a universal joint between the driver and tool holder located in the vertical line of the working end of the forming tool, a guide for the driver movable about an axis in the vertical plane of the headstock and oblique to the axis of the guide, the axis of the said guide being also movable in the plane of the tool holder, and means for locking the carrier in a selected position and orientation and means for moving the tool holder horizontally.

3. In a device for forming articles with a conoidal surface, the combination with a horizontal head stock and a chuck mounted thereon, of a forming tool, a movable holder therefor, a stationary support, a pair of links pivoted to each other, one of said links being pivoted to to the tool holder and the other to the stationary support, all of said pivots being vertical with the pivot between said first named link and holder located in the vertical line of the working end of the forming tool, a movable driver, a universal joint between the driver and tool holder located in the vertical line of the working end of the forming tool, a frame guiding the driver mounted for rotation on a carrier about an axis oblique to the axis of the driver said axis being also located in the vertical plane of the axis of the head stock, said carrier for the frame being movably mounted on the stationary support to tilt in a vertical plane about the center of the universal joint when the driver is in the vertical plane of the axis of the head stock, means for locking the carrier in a selected position on said stationary support and means for moving the tool holder horizontally.

4. In a device for forming articles with a conoidal surface, the combination with a horizontal head stock and a chuck mounted thereon, of a forming tool, a movable holder therefor, a stationary support, a parallel link device articulated to the holder at one end and to said stationary support at the other end with the axes of articulation positioned vertically, a movable driver, a universal joint between the driver and the tool holder located in the vertical line of the working end of the forming tool, a frame carrying the driver mounted for rotation on a carrier about an axis oblique to the driver said axis being also located in the vertical plane of the axis of the head stock, said carrier for the frame being movably mounted on the stationary support to tilt in said vertical plane about the center of the universal joint when the driver is in the vertical plane of the axis of the head stock, means for locking the carrier in a selected position on said stationary support and means for moving the tool holder horizontally.

5. In a device for forming articles with conoidal surfaces, the combination with a horizontal head stock and chuck mounted thereon, of a grinding tool in the horizontal plane of the axis of the head stock, a movable holder for the tool, a stationary support, a pair of links pivoted to each other, one of said links being pivoted to the tool holder and the other to said stationary support, all of said pivots being vertical with the pivot between the first named link and holder located in the vertical line of the working end of the forming tool, a movable driver, a universal joint between the driver and tool holder located in the vertical line of the working end of the forming tool, a frame carrying the driver mounted for rotation on a carrier about an axis oblique to the driver said axis being also located in the vertical plane of the head stock, means for tilting the carrier and frame about an axis at right angles to the vertical plane of the head stock, a slotted ear projecting rearwardly from the tool holder in the vertical plane of the head stock and having a slot therein elongated in the said plane, a finger on the driver projecting in the vertical plane of the head stock when the driver is in such plane and engaging said slot and means for locking the frame in a selected position on said stationary support.

6. In a device of the class decribed, the combination with a horizontal head stock and chuck thereon, of a forming tool, a movable holder for the tool whereby the working point of the tool is movable in the morizontal plane of the axis of the head stock, an ear projecting rearwardly from the tool holder having an elongated slot therein lying in the vertical plane with the working point of the tool, a frame mounted for rotation on a carrier and driven about an axis inclined to the axis of the head stock, said axis being also located in the vertical plane of said head stock, a bar slidingly mounted in said frame and movable in a path inclined to the axis of the frame, a universal joint connecting said bar and tool holder at a point vertically below the working point of the tool and at a fixed distance therefrom and a finger projecting outwardly from the said bar engaging said slot and located in the same plane as the universal joint and the axis of the frame.

7. In a device of the class described, the combination with a horizontal head stock and a chuck mounted thereon, of a forming tool, a movable holder therefor provided with a pivotal mounting including a pivot shaft, a support, means for moving the working point of the tool in the horizontal plane of the axis of the head stock, a frame mounted for rotation on a carrier about an axis located in the vertical plane of the axis of the head stock, a driver slidably mounted on the frame, a carrier for the frame mounted on said support for movement in a straight line inclined to the axis of the frame, a universal joint connecting the driver and said pivot shaft of the tool holder whereby the movement of the tool is controlled by the movements of the driver and whereby the center of the universal joint is constrained to move in a plane parallel with that in which the tool holder is movable, means for tilting the carrier on said support about the center of the universal joint when that center is in the vertical plane of the head stock and means for adjusting the carrier and frame on said support in said plane along a line parallel to the axis of the driver when it is in said vertical plane.

8. In a device of the class described, the combination with a horizontal head stock and a chuck mounted thereon, of a forming tool, a movable holder therefor provided with a pivotal mounting including a pivot shaft having its axis located in vertical alignment with the working point of the forming tool, means for moving the working point of the tool in the horizontal plane of the axis of the head stock, a carrier, a frame mounted on the carrier for rotation about an axis located in the vertical plane of the axis of the head stock, a driver slidably mounted on the frame at an angle to the axis of the frame, a universal joint connecting the driver and the pivot shaft of the tool holder at a point vertically aligned with the tool point whereby the movement of the tool is controlled by the movements of the driver and whereby the axis of the driver is constrained to move in a plane parallel with that in which the tool holder is movable.

9. In a device of the class described, the combination with a horizontal head stock and chuck mounted thereon, of a forming tool, a movable holder therefor, means for moving the holder so as to move the working point of the tool in the horizontal plane of the axis of the head stock, a frame mounted for rotation on a movable carrier and driven about an axis inclined to the axis of the head stock and contained in the vertical plane of said head stock, a reciprocal bar mounted in said frame to drive it and arranged to move along its own axis, a universal joint connecting the said bar and the tool holder at a point vertically below the working point of the tool and at a fixed distance therefrom, a sliding connection between the tool holder and the bar located in the same plane as the universal joint and the axis of the frame, means for tilting the carrier and frame about the center of the universal joint in the vertical plane of the head stock in a direction parallel to that of the bar when the latter is located in the vertical plane of the head stock.

10. In a device of the class described, the combination with a horizontal head stock and chuck mounted thereon, of a forming tool, a movable holder therefor, a pivot for the holder located in vertical alignment with the working point of the tool and the axis of the head stock, a forming tool mounted in the holder so as to traverse the horizontal plane of the axis of the head stock, an ear projecting rearward from the tool holder and having an elongated slot in the vertical axial plane of the tool, a frame mounted for rotation on a movable carrier and driven about an axis inclined to the axis of the head stock and contained in its vertical plane, a bar slidingly mounted in said frame to drive it and arranged to move in a path inclined to the axis of the frame, a finger connected to said bar engaging the slot in said ear and located in the vertical plane of the head stock when the sliding bar is in that plane, a universal joint connecting said bar and tool holder at a point vertically below the working point of the tool and at a fixed distance therefrom, a support for said carrier, means for tilting the carrier and frame about the center of the universal joint and in the vertical plane of the head stock and means for sliding the carrier on said support in said vertical plane and parallel to the bar when the latter is in that vertical plane.

ROBERT G. R. TOUVAY.

REFERENCES CITED

The following references are of record in the file of this patent:

UNITED STATES PATENTS

| Number | Name | Date |
| --- | --- | --- |
| 637,476 | Nerz | Nov. 21, 1899 |